July 29, 1941.  J. S. DONNELLAN  2,250,525
SPRINKLER
Filed May 21, 1940
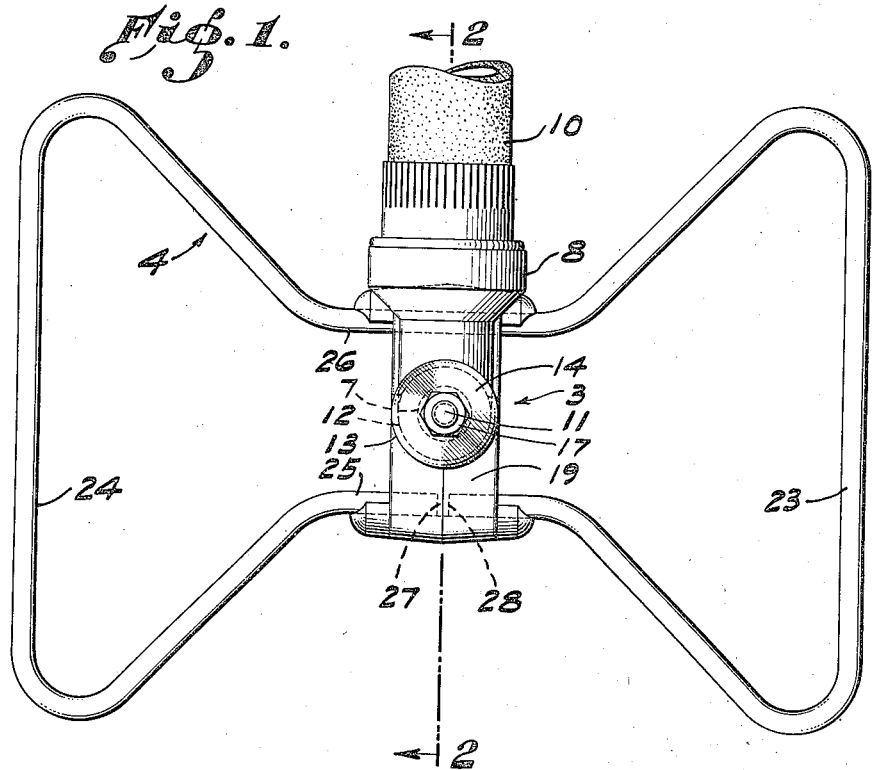
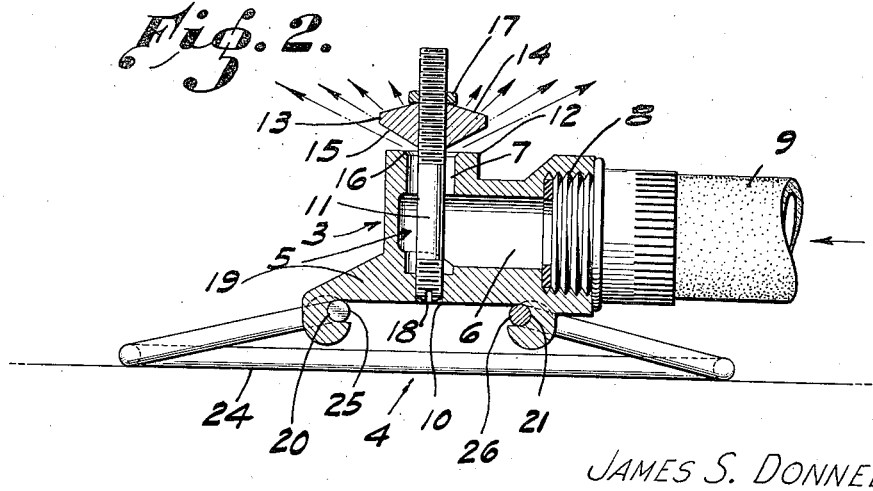
JAMES S. DONNELLAN,
INVENTOR.
BY
ATTORNEY.

Patented July 29, 1941

2,250,525

UNITED STATES PATENT OFFICE 2,250,525

SPRINKLER

James S. Donnellan, Los Angeles, Calif.

Application May 21, 1940, Serial No. 336,393

2 Claims. (Cl. 299—56)

The present invention relates to a garden or lawn sprinkler.

The invention resides in the novel combination and arrangement of parts and in the details of construction hereinafter described and claimed, it being understood that changes in the precise embodiment of the invention herein disclosed may be made within the scope of that which is claimed without departing from the spirit of the invention.

In the drawing wherein is shown a preferred embodiment of the invention as now reduced to practice and being introduced to the trade;

Fig. 1 is a plan view of the device, a fragment of a hose being included in the view; and, Fig. 2 is a section taken on line 2—2 of Fig. 1 with some of the parts preferably shown in side elevation rather than in section.

Referring in detail to the drawing it will be seen the invention comprises a sprinkler head 3 supported in a somewhat elevated position with respect to the grade by means of a wire base 4.

The head 3 is provided with an L-shaped tubular passageway 5, the opening 6 represented by the longer leg of the L constituting the horizontal passageway; and the opening 7 represented by the shorter limb of the L constituting the vertical passageway. The opening 6 is shown as having a greater diameter than that of the opening 7, and the outer end portion 8 of the opening 6 is enlarged and threaded to provide a suitable means for connecting therewith one end of the hose 9.

Screwed into a tapped hole 10, located in the wall of the head which is opposite the opening 7, is a post 11. Post 11 is mounted axially of the opening 7 with an annular clearance therearound, and the free end thereof is threaded and extends beyond the outer face of the wing 12 of the head in which the opening 7 is partly situated.

Onto the projecting end of the post 11 is screwed a deflector 13. Said deflector has diverse conically beveled faces comprising a short bevel 14 at one end and a long bevel 15 at the opposite end and is reversibly mountable upon said post. The short bevel is adapted to produce a low, short range spray while the long bevel is adapted to produce a high, long spray.

In Fig. 2 of the drawing the long bevel of the deflector is shown situated adjacent to and somewhat away from its seat 16, as would be the case when the sprinkler was being used sufficiently far from the building as not to strike it. In the position of the deflector just stated there would be a copious flow of water such as would be occasioned when one wished to irrigate. Screwing the deflector farther down on the post would cause the water to spray in the direction indicated by the arrows. The closer the deflector is screwed toward the seat the finer the water particles will be split up.

I also provide a nut 17 on the post to screw down upon the deflector after it is once adjusted to produce the proper intensity of spray to lock or "freeze" said deflector in place. By this means the deflector will be prevented from wearing loose on the post which would tend to create an uneven peripheral dispersion of the water being delivered beneath the deflector.

The post 11 is provided with a kerf 18 for the application of a tool to screw the post counterclockwisely into place, this being accomplished by bringing the lower end of the post into an alined engagement with the upper end of the bore 10 and then inserting the tool upwardly through said hole into said kerf.

The lower side of the nozzle is provided with a plate-like bottom 19 having transversely extending inbent flanges providing opposed seats 20 and 21 for detachably fastening the wire base 4 thereto. Said base comprises a loop-shaped figure which is formed from a single strand of wire having longitudinally extending parallel sides 23 and 24 and contracted transversely extending parallel sides 25 and 26 in a vertically pitched relation to the sides 23 and 24. Said contracted parallel sides occupying the aforesaid seats.

The ends 27 and 28 of the wire strand are shown disconnected and as occupying seat 20. This arrangement permits the ends of the wire to be sprung sufficiently far apart whereby they may be caused to enter said seat.

In the operation of the device when it is desired to spray high with the greatest range the deflector will be screwed upon the post in the manner shown in Fig. 2 of the drawing. When it is desired to spray low near a building the position of the deflector will be reversed from the position shown in Fig. 2 with the short bevel 14 directed toward the seat 16.

When the deflector is screwed sufficiently close to the seat as to produce a solid conical spray the size of a common saucer, heavier drops of water will be dispersed than when the deflector is screwed sufficiently close to the seat as to produce a solid conical spray the size of a common dinner plate. With the deflector set according to the latter recited position the water could be permitted to run indefinitely without bogging. In either the high or the low dispersive position in which the deflector may be placed the water fall will be uniformly distributed throughout the entire area being sprinkled.

What is claimed is:

1. A nozzle body comprising a base having a flat bottom wall which underlies a discharge passage leading through said body, and a pair of elongated parallel flanges extending downwardly from the lower side of said wall, each of said flanges having an elongated horizontal seat extending lengthwise thereof and directed toward the seat of its fellow to receive a wire support.

2. A nozzle body having through it a passage which has an upwardly directed discharge portion, said body having a horizontal bottom wall underlying said upwardly directed discharge portion and furnished with a vertical screw threaded bore spaced vertically below said discharge portion, and a pair of elongated parallel flanges extending downwardly from the lower side of said wall, each of said flanges having an elongated horizontal seat extending lengthwise thereof and directed toward the seat of its fellow.

JAMES S. DONNELLAN.